United States Patent
Palombo et al.

[15] 3,696,354

[45] Oct. 3, 1972

[54] POSITION CONTROL SYSTEM

[72] Inventors: Gaston Albert Palombo, 28 Rose Ave., Watertown, Mass. 02173; Thomas A. Boissevain, 24 Paul Revere Road, Bedford, Mass. 01730

[22] Filed: Nov. 19, 1971

[21] Appl. No.: 200,574

Related U.S. Application Data

[63] Continuation of Ser. No. 863,226, Oct. 2, 1969, abandoned.

[52] U.S. Cl. ..........................................340/174.1 C

[51] Int. Cl. ..........................G11b 5/52, G11b 21/10

[56] References Cited

UNITED STATES PATENTS

| | | | |
|---|---|---|---|
| 2,947,929 | 8/1960 | Bower | 318/594 |
| 3,072,833 | 1/1963 | Kerr et al. | 235/92 |
| 3,117,263 | 1/1964 | MacDonald | 318/544 |
| 3,139,570 | 6/1964 | Jacobson et al. | 235/92 |
| 3,458,785 | 7/1969 | Soroello | 318/594 |

*Primary Examiner*—Vincent P. Canney
*Attorney*—Ronald T. Reiling

[57] ABSTRACT

Positioning apparatus for controlling the relative placement of two members in which coarse control is performed in a first mode and fine control in a second mode. Switching between modes occurs automatically. A profile utilizing discrete signals is used for minimizing transit time.

8 Claims, 3 Drawing Figures

PATENTED OCT 3 1972 3,696,354

INVENTORS
GASTON A. PALOMBO
THOMAS A. BOISSEVAIN
BY Fred Jacob
ATTORNEY

POSITION CONTROL SYSTEM

This is a continuation of U.S. application Ser. No. 863,226 for "Position Control System," filed on Oct. 2, 1969 and now abandoned.

BACKGROUND OF THE INVENTION

This invention relates in general to position control systems, and in particular to systems for rapidly and accurately positioning a movable member relative to another member.

One important application of such systems is in random access mass memory devices of the type used in conjunction with computer systems. It will be understood however, least the invention is not so limited. Where information storage devices, such as disks or drums, have movable recording heads to effect reading and writing of data in discrete tracks on a recording surface, the conflicting demands of a short positioning time and an accurate final position place severe constraints upon the positioning system. In order that overall computation time of the associated computer system not be increased the permissible time interval for accessing the desired location must be kept brief. It is also important that the recording surface be efficiently utilized by storing the maximum amount of information. To this end, the mutual track spacing must be kept small consistent with the resolution capabilities of the recording head to perform read and write operations. Any impediments placed on the ability to access closely spaced tracks with the magnetic head serves to lessen the efficiency and the total capability of the system.

These conflicting requirement have not been satisfactorily resolved in prior art devices or, if so, only at excessive cost. The result has been that the inadequacies of the recording head positioning system have frequently placed constraints on the operation, not only of the random access mass memory itself, but also on the associated computer system.

Accordingly, it is the primary object of the present invention to provide a position control system which is not subject to the foregoing disadvantages.

It is another object of the invention to provide a position control system which combines rapid access time with accurate final positioning.

It is a further object of the present invention to provide a low cost, rapid access control system for accurately positioning a recording head with respect to a recording surface.

SUMMARY OF THE INVENTION

The foregoing objects are attained in the present invention by providing a servo position control system having two distinct modes of operation; a first mode for accomplishing coarse position control and a second mode for fine control during final positioning. Automatic switching between modes occurs in accordance with predetermined criteria. The system additionally comprises means for minimizing transit time by employing a velocity profile based on the characteristics of the system itself.

The foregoing objects and features of the invention, together with further objects, features and advantages thereof, will become apparent from the following specification, when read with the accompanying drawings in which.

Figure 1:
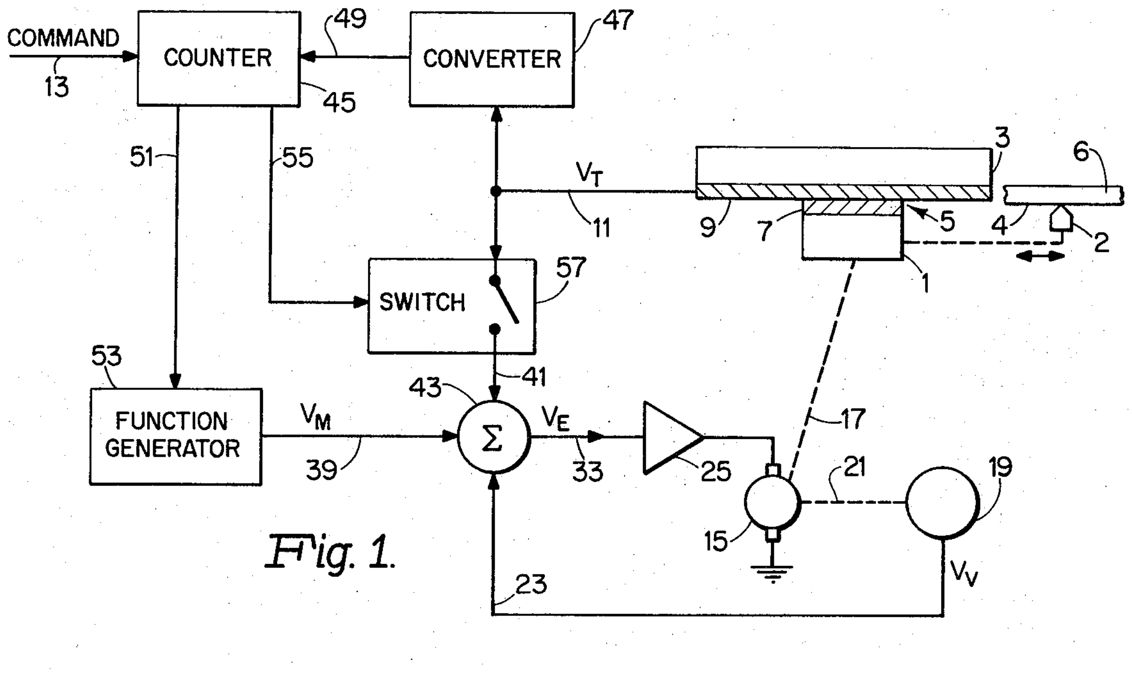
FIG. 1 is a block diagram of a preferred embodiment of a position control system in accordance with the present invention.

Turning now to FIG. 1, there is shown a control system for the positioning of a movable member 1 with respect to a stationary member 3. In the preferred embodiment of the invention, The member 1 is coupled to a magnetic recording head 2 to position the latter relative to a recording surface 4. More specifically, the magnetic head is movable as indicated by the reference numeral 13 to access successive, mutually spaced tracks on the magnetic surface, e.g., of a rotatable disk 6.

A transducer 5 is composed of two sections 7 and 9 which are mounted on the members 1 and 3, respectively. The transducer may be one of several types well known in the art, capable of sensing relative displacement of the separate transducer sections so as to provide a responsive output signal $V_T$ on lead 11. As will become clear from the discussion of FIG. 3 hereinbelow, in the preferred embodiment of the invention transducer 5 comprises a linear transformer which provides a cyclic output signal each time the member 1 moves an amount defined as a unit distance, with respect to member 3. It will be clear that the member 1 may need to traverse a number of unit distances to reach a desired location. The relationship between unit distances and inter-track spacing on the recording surface will depend on the specific device. Where the inter-track spacing is smaller than one unit distance, the member 1 must be capable of being positioned to a point within a unit distance so that the magnetic head can be positioned on the desired track.

Figure 3:
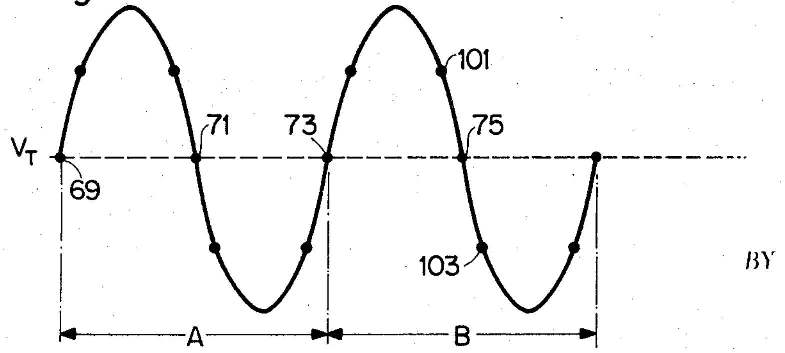
FIG. 3 illustrates the fine positioning operation of the apparatus of FIG. 1.

The cyclic output signal $V_T$ of the transducer is shown in FIG. 3. Included with the position transducer, may be a high frequency carrier generator whose output signal is amplitude modulated by the relative position of the transducer sections and is subsequently demodulated. This type of circuit is well known to those skilled in the art and has not been illustrated since it does not form part of the present invention. Also, in order that final track positions at, or offset from, consecutive nulls may be used by the system, the circuitry will include well known phase reversal means capable of changing the polarity of waveform $V_T$ when required for the desired final location of the magnetic head.

As shown in FIG. 1, the member 1 is positioned by a drive means such as a motor 15, which is mechanically coupled thereto, as schematically indicated by the reference numeral 17. A velocity sensing means, such as a tachometer 19, is shown to be coupled to the motor 15 by a coupling 21 and provides a signal $V_v$ on its output lead 23 that is representative of the velocity of member 1. An amplifier circuit 25 is connected to the input of motor 15 to energize the latter. A summing network 43 is coupled to the amplifier circuit 25 by way of a lead 33. The network 43 receives input signals on leads 23, 39 and 41 to provide an error signal $V_e$ on lead 33.

FIG. 1 further includes a counter 45, which receives a digital input command signal via lead 13. In a typical situation, the command signal may be derived from an associated computer system. A converter 47 receives the transducer output signal $V_T$ on lead 11, its output in turn being coupled to the counter 45. As shown in FIG. 1, two counter output leads 51 and 55 are provided. Lead 55 is connected to activate a switch 57 which, in turn, is connected between the leads 11 and 41. Lead 51 is connected to the input of a function generator 53 and is adapted to provide a signal to the latter representative of the prevailing count in the counter.

The function generator 53 is adapted to provide an output signal $V_M$ on output lead 39 having different voltage level, in accordance with different ranges of the count represented by the signal on lead 51. The number and amplitude of these voltage levels is chosen in accordance with the overall characteristics of the position control system in order to optimize the operation of the latter and to reduce the transit time of member 1. In a practical embodiment of the invention, three discrete voltage levels are used, each being effective to cause the system to servo to its final position at a different rate. As will be explained hereinbelow with reference to FIG. 2, the voltage level of the signal $V_M$, and hence the velocity of the member 1, will decrease stepwise depending upon the proximity of the member 1 to its final position in terms of unit distances.

The operation of the apparatus of FIG. 1 will be explained with the aid of the waveforms of FIGS. 2 and 3. At time $T_1$ a digital command, indicative of a desired track position of the recording head, is applied to the counter 45 via lead 13, to store a corresponding track count in the counter. The resultant signal on lead 55 is applied to switch 57 and is effective to disconnect the output of the position transducer 5 from the summing network 43.

Figure 2:
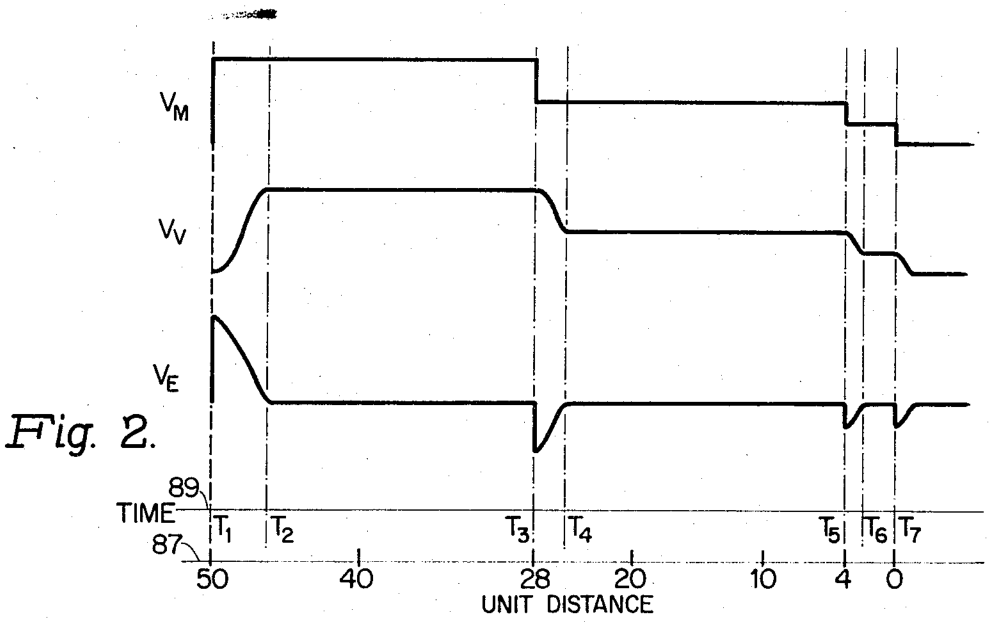
FIG. 2 depicts representative waveforms for use in illustrating the coarse positioning operation of the apparatus of FIG. 1.

In FIG. 2, the reference numeral 87 designates the axis on which are indicated unit distances that remain to be traversed by the member 1 before the unit distance is reached in which the desired track is located. The reference numeral 89 represents the time axis, indicative of the respective points in time at which various positions of the member 1 are reached. FIG. 2 further illustrates the signals $V_M$, $V_V$, and $V_E$, which appear on the leads 39, 23 and 33 respectively.

At the beginning of the operation, the number of unit distances to be traveled by member 1 to the final unit distance will depend on the desired track location, as determined by the command signal, and on the position of the member 1 at time $T_1$. In the example under consideration, it is assumed that there are 50 unit distances to be traveled. It will be seen that the output signal $V_M$ of the function generator is at its highest voltage level during the interval $T_1$ to $T_3$. A positive error signal $V_E$ results and the member 1, which is driven by motor 15, accelerates between times $T_1$ and $T_Z$, from its rest position to a first velocity corresponding to the level of $V_M$. This condition is indicated by the tachometer output signal $V_V$ which is representative of the velocity of the member 1. As a result of the summing action of the signals $V_M$ and $V_V$, the error signal $V_E$ goes to zero at time $T_2$ and the member 1 is maintained at a stable velocity between times $T_2$ and $T_3$.

At time $T_3$ there are 28 unit distances to be traversed by the member 1, as evidenced by the count on lead 51. In accordance with the overall characteristics of the system, the function generator 53 is arranged to cause the output signal $V_M$ to switch to its middle voltage level when this point is reached. As shown in FIG. 2, a negative error signal is generated. The latter is effective to decelerate the motor as well as the member 1, as evidenced by waveform $V_V$ during the interval $T_3$ to $T_4$. At time $T_4$, a stable velocity is reached representative of the middle voltage level of signal $V_M$. This velocity is maintained until time $T_5$ when the count on lead 51 indicates that the member 1 is within four unit distances of its final unit distance. In accordance with the system characteristics, the function generator 53 is arranged at this point to switch the signal $V_M$ to a still lower voltage level. The previously described operation repeats at this time, with the member 1 stabilizing on the corresponding velocity value at time $T_6$.

At time $T_7$ the final unit distance is reached and the value of the output signal $V_M$ now becomes representative of the final track position within the last unit distance to which the member 1 is to be positioned. Simultaneously, the switch 57 closes in response to the signal appearing on lead 55. As a result the signal $V_T$ is now directly applied to the summing network 43.

In FIG. 3, the waveform of the position transducer output signal $V_T$ is shown over two unit distances A and B. As will be seen from the drawing, two null points per unit distance are obtained, e.g., the null points 69 and 71 for unit distance A and the null points 73 and 75 for unit distance B. If it is desired to move the head to the track represented by the null point 75, the voltage level of the output signal $V_M$ will be zero following time $T_7$. With the switch 57 closed, the final motor position will be determined by the signals on leads 41 and 23 which are fed to the summing network 43. Hence the motor 15, and thus the movable member 1 and the associated magnetic head 2, will come to rest at the null point 75.

As previously explained, in the embodiment of the invention under discussion the spacing between successive tracks on the recording surface is a sub-multiple of a unit distance. In FIG. 3, the offset position points 101 and 103 are each representative of a discrete track location. If the input command signal applied to the lead 13 has specified a track location that corresponds to position point 101 on the waveform $V_T$ the output signal $V_M$ will have a discrete voltage level that balances the signal $V_T$ corresponding to the position point 101 on waveform $V_T$. Thus, the voltage level of the signal $V_M$ may be viewed as an "offset" value injected into the network 43 to cause the motor 15 and hence the movable member 1 and the associated magnetic head 2, to move to the "offset" position with respect to the null point 75, as this then is the desired track location within the final unit distance. It will be apparent that, had the desired track been that represented by position point 103 on waveform $V_T$, the signal $V_M$ would have been of opposite polarity. It also will be apparent to those skilled in the art that a polarity change of the signal $V_T$ would be required if nulling had occurred about the null point 73 instead of about null point 75. This is necessitated by the opposite slope of the waveform $V_T$. As previously explained, the required circuitry for accomplishing such polarity reversal is well known in the art and has been omitted from the drawing for the sake of clarity.

It will be clear that modifications may now be made without departing from the scope of the invention. For example, while the transducer contemplated in the preferred embodiment of the invention may use inductive coupling, other types of coupling between the respective transducer sections, e.g., capacitive of optical coupling, could readily be substituted. Similarly, in lieu of the illustrated transducer arrangement using a linear movement, it is also possible to provide relative rotary movement between the transducer sections. Indeed, it would be possible to dispense with the transducer entirely and instead to generate the signal $V_T$ from a readout of one or more magnetic heads moving in a radial direction relative to the tracks on the recording surface on the disk 6.

It will be understood that the position control system disclosed hereinabove is only exemplary of a preferred embodiment of the invention. The invention is applicable to other devices and may find utility whereever it is necessary to position a movable member rapidly to an accurately defined desired position.

Numerous modifications, variations and equivalents will now occur to those skilled in the art all of which fall within the spirit and scope contemplated by the invention. Hence the invention herein is limited only by the scope of the appended claims.

What is claimed is:

1. Apparatus for positioning a first member relative to a second member comprising:

means for sensing said first member's position;

means for effecting a change of said first member position with respect to said second member position, said change effecting means including driving means coupled to at least one of said members;

a first feedback path connected between said position sensing means and said change effecting means, said first feedback path including:

Means for measuring the positional difference between the sensed first member's position and a desired position of said first member, said measuring means providing an output signal indicating one range from among a plurality of predetermined ranges of positional differences between the sensed and the desired position of said first member;

means for generating a constant, single valued, discrete displacement rate signal in the form of a constant, single valued, discrete voltage level in response to each predetermined range of positional difference indicated by the output signal provided by said measuring means;

means for sensing the rate of change of said first member's position;

a second feedback path for transmitting a signal, from said rate sensing means, which represents the rate of change of said first member's position;

means for summing the rate of change signal from said second feedback path with the constant, single valued, discrete displacement rate signal from said generating means; and a third feedback path, connected between said position sensing means and said summing means, for feeding back an analog signal representing the sensed position of said first member, said third feedback path including a switch means operative in response to said comparing means; said switch means being effective to complete said third feedback path when a predetermined range of positional difference between the sensed and the desired positions of said first member occurs.

2. The apparatus of claim 1 wherein said first feedback path includes means coupled to said position sensing means for providing digital pulses in accordance with the relative travel by said first member relative to said second member; and means for applying said last-recited pulses to said measuring means.

3. The apparatus of claim 1 wherein said position sensing means is adapted to provide an output signal which varies periodically in accordance with unit distances traveled by said first member when moving relative to said second member.

4. In a random access storage device of the type having a plurality of mutually spaced tracks disposed on a magnetic recording surface and at least one magnetic head adapted to access different ones of said tracks, said head being coupled to a first member, apparatus for positioning said first member relative to another member comprising:

a counter connected to receive a command signal representative of the desired track position of said magnetic head;

transducer means for monitoring said first member and for generating a signal indicative of its actual position;

means responsive to said last-recited signal for decrementing the count of said counter;

a summing network;

generating means for applying an output constant, single valued, discrete displacement rate signal to said summing network in response to the prevailing count, said generating means responding to different ranges of said count to provide corresponding constant, single valued, discrete voltage levels of said output constant, single valued, discrete displacement rate signal, driving means responsive to a signal derived from said network for moving said first member;

means coupled to said first member for generating a signal indicative of the velocity of the latter, means for coupling said last-recited signal to said summing network;

and switch means responsive to a predetermined count to connect said transducer means to said summing network.

5. The apparatus of claim 4 wherein said transducer is adapted to provide an output signal which varies periodically in accordance with unit distances traveled within the total travel of said first member, said decrementing means comprising a converter for generating pulses in response to said last-recited output signal.

6. The apparatus of claim 5 wherein the output signal of said generating means is effective to drive said first member to a discrete desired position within a unit distance when said transducer is connected to said summing network.

7. In a random access storage device of the type having a plurality of mutually spaced tracks disposed on a magnetic recording surface and including at least one magnetic head adapted to access different ones of said tracks, said head being coupled to a first member, positioning apparatus comprising in combination driving means for moving said first member through a plurality of unit distances relative to a second member, means for operating said driving means in a first mode, said last recited means including, a function generator adapted to provide an output displacement rate signal, means adapted to provide a velocity signal indicative of said member velocity, summing means responsive to said velocity signal and said output displacement rate signal to provide an error signal, means coupled to said driving means for amplifying said error signal, transducer means for providing an output signal representative of the relative position of said members within each unit distance, means responsive to said transducer output signal for deriving a pulse for each unit distance traversed, counter means responsive to command signal to store a digital representation of the total unit distance to be traversed, means for decrementing the count of said counter with each of said pulses, said function generator being connected to said counter means and responding to different ranges of said count to provide corresponding constant, single valued, discrete voltage levels of said output displacement rate signal, and switch means coupled in series between said transducer means and said summing means, said switch means being responsive to a predetermined count to connect said transducer means to said summing means;

whereby the operation of said positioning apparatus is changed from a first mode to a second mode.

8. The method of controlling the relative position of a pair of members comprising the steps of:

sensing the actual relative position of said members and generating a corresponding first signal;

sensing the rate of change of said relative position and generating a corresponding second signal;

comparing said first signal with a signal representative of a desired relative member position to generate a third signal;

summing said first signal with said third signal to generate an error signal;

controlling said rate of change of relative position with said error signal;

combining said first, second and third signals to generate a new error signal when said actual relative position moves within predetermined limits of said desired position;

whereby the relative position of said members is controlled in accordance with said rate of change outside said predetermined limits, and said control within said predetermined limits occurs in accordance with said relative position.

* * * * *

UNITED STATES PATENT OFFICE
CERTIFICATE OF CORRECTION

Patent No. 3,696,354 Dated October 3, 1972

Inventor(s) GASTON ALBERT PALOMBO ET AL

It is certified that error appears in the above-identified patent and that said Letters Patent are hereby corrected as shown below:

On the cover sheet insert -- [73] Assignee Honeywell Inc., Minneapolis, Minnesota --.

Signed and sealed this 1st day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.